US009418087B2

(12) United States Patent
Mattox et al.

(10) Patent No.: US 9,418,087 B2
(45) Date of Patent: Aug. 16, 2016

(54) MIGRATING INFORMATION DATA INTO AN APPLICATION

(75) Inventors: John R. Mattox, Holly Springs, NC (US); Norman Lee Faus, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1115 days.

(21) Appl. No.: 12/040,770

(22) Filed: Feb. 29, 2008

(65) Prior Publication Data

US 2009/0222413 A1 Sep. 3, 2009

(51) Int. Cl.
*G06F 17/00* (2006.01)
*G06F 17/30* (2006.01)
*G06F 9/455* (2006.01)

(52) U.S. Cl.
CPC .............. *G06F 17/303* (2013.01); *G06F 9/455* (2013.01)

(58) Field of Classification Search
USPC .......................... 707/705–780, 809; 715/780
See application file for complete search history.

(56) References Cited

U.S. PATENT DOCUMENTS

| 7,155,462 | B1* | 12/2006 | Singh et al. .................... 717/170 |
| 7,548,927 | B2* | 6/2009 | Turner et al. |
| 7,817,790 | B2 | 10/2010 | Sanmugasuntharam et al. |
| 7,953,759 | B2 | 5/2011 | Grossman et al. |
| 8,406,389 | B2 | 3/2013 | Mousseau et al. |
| 2002/0161733 | A1 | 10/2002 | Grainger |
| 2003/0004999 | A1 | 1/2003 | Walker et al. |
| 2003/0028503 | A1* | 2/2003 | Giuffrida ............ G06F 17/2745 |
| 2004/0010521 | A1* | 1/2004 | Li et al. .......................... 707/200 |
| 2004/0107212 | A1 | 6/2004 | Friedrich et al. |
| 2004/0267792 | A1 | 12/2004 | Kobayashi |
| 2005/0007249 | A1* | 1/2005 | Eryurek et al. ................ 340/511 |
| 2005/0108262 | A1* | 5/2005 | Fawcett et al. ................ 707/100 |
| 2005/0154760 | A1* | 7/2005 | Bhakta et al. .............. 707/104.1 |
| 2005/0233735 | A1 | 10/2005 | Karaoguz et al. |
| 2005/0273726 | A1* | 12/2005 | Wyzga et al. .................. 715/780 |
| 2006/0004739 | A1 | 1/2006 | Anthony et al. |
| 2006/0122973 | A1 | 6/2006 | Berg et al. |
| 2007/0192289 | A1 | 8/2007 | Lin et al. |
| 2007/0201655 | A1 | 8/2007 | Shenfield |
| 2009/0083336 | A1* | 3/2009 | Srinivasan .................... 707/200 |
| 2009/0144236 | A1 | 6/2009 | Mattox et al. |
| 2009/0222414 | A1 | 9/2009 | Mattox et al. |
| 2009/0222433 | A1 | 9/2009 | Mattox et al. |

OTHER PUBLICATIONS

Ray et al., Mac OS X Tiger Unleashed, Jun. 29, 2005, Sams, p. 1-9 and 1-10.
Vignette, "Vignette Collaboration", May 2004, Vignette, p. 1-31 <http://web.archive.org/web/20050306180913/a2000.g.akamai.net/7/2000/812/e5627ba877a55e/www.vignette.com/Downloads/WP_VignCollaboration.pdf>.

(Continued)

*Primary Examiner* — Hosain Alam
*Assistant Examiner* — Tuan-Khanh Phan
(74) *Attorney, Agent, or Firm* — Lowestein Sandler LLP

(57) ABSTRACT

A data classification module is configured to retrieve information from the repository and migrate the information into applications. The data classification module is configured to receive a request to migrate information and data from the repository into an application. The request can include the type of application and the type of information and data requested. The application can be an new application or an existing application. In order to locate information and data to migrate, the data classification module is configured to maintain rules that describe how the various applications maintain data and information.

21 Claims, 11 Drawing Sheets

(56) References Cited

OTHER PUBLICATIONS

USPTO; Office Action for U.S. Appl. No. 11/948,605, mailed Mar. 29, 2010.
USPTO; Office Action for U.S. Appl. No. 11/948,605, mailed Dec. 1, 2010.
USPTO; Office Action for U.S. Appl. No. 11/948,605, mailed Aug. 14, 2012.
USPTO; Office Action for U.S. Appl. No. 11/948,605, mailed Dec. 7, 2012.
USPTO; Office Action for U.S. Appl. No. 11/948,605, mailed Jun. 25, 2013.
USPTO; Office Action for U.S. Appl. No. 12/040,815, mailed Aug. 6, 2010.
USPTO; Office Action for U.S. Appl. No. 12/040,815, mailed Jan. 24, 2011.
USPTO; Advisory Action for U.S. Appl. No. 12/040,815, mailed Apr. 6, 2011.
USPTO; Office Action for U.S. Appl. No. 12/040,815, mailed Aug. 1, 2012.
USPTO; Office Action for U.S. Appl. No. 12/040,815, mailed Feb. 11, 2013.
USPTO; Office Action for U.S. Appl. No. 12/040,815, mailed Dec. 17, 2013.
USPTO; Office Action for U.S. Appl. No. 12/040,852, mailed Apr. 28, 2010.
USPTO; Office Action for U.S. Appl. No. 12/040,852, mailed Dec. 23, 2010.
USPTO; Office Action for U.S. Appl. No. 12/040,852, mailed May 25, 2011.
USPTO; Office Action for U.S. Appl. No. 12/040,852, mailed Dec. 13, 2011.
USPTO; Office Action for U.S. Appl. No. 12/040,852, mailed Jul. 24, 2013.

\* cited by examiner

MIGRATING INFORMATION DATA INTO AN APPLICATION

FIELD

This invention relates generally to data classification systems, more particularly, to methods and systems for providing information to a requester.

DESCRIPTION OF THE RELATED ART

The amount of data available to information seekers has grown astronomically, whether as the result of the proliferation of information sources on the Internet, or as a result of private efforts to organize business information within a company, or any of a variety of other causes. As the amount of available data grows, so does the need to be able to categorize or label that data so that the data may be more efficiently searched and a user may determine the relevance of data to them.

For businesses and organizations, data from different applications is typically grouped together based on the data's relation to a person or entity with which business is conducted, such as a client. For example, a business may arrange the data from different applications under a folder for a particular client. However, in order to view the different data, a user must view the data in each separate application in order to determine the nature and subject of the data.

Additionally, different types of applications typically maintain their data in different formats, but often maintain the same information. Likewise, application of the same type, for example word processing applications, often maintain data in different formats. However, it may not be possible to cross utilize this information because the different formats are often incompatible. As such, user may be required to reenter information because the formats are incompatible and the application lack the ability to convert the information. Accordingly, there is a need in the art for a mechanism to allow users to migrate information and data between applications.

BRIEF DESCRIPTION OF THE DRAWINGS

Various features of the embodiments can be more fully appreciated, as the same become better understood with reference to the following detailed description of an embodiment when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for classifying and organizing data from a variety of applications based on entities associated with the data. More particularly, a data classification module is configured to retrieve data from different applications. Each application can utilize data in a different format from other applications. The data classification module is configured to extract identifying information from the data, received from the applications. The identifying information includes information on entities and persons related to the data. For example, entities can be companies, corporations, associations, organization, and the like. Persons can be anyone related to the entities and the data such as employees of the entity.

The data classification module is configured to organize the identifying information into a data structure based on the entities associated with the data. After organization, the data classification module is configured to store the data structure in a searchable repository.

According to embodiments, the data classification module is further configured to retrieve information from the repository and migrate the information into applications. The data classification module is configured to receive a request to migrate information and data from the repository into an application. The request can include the type of application and the type of information and data requested. The application can be an new application or an existing application. In order to locate information and data to migrate, the data classification module is configured to maintain rules that describe how the various applications maintain data and information.

By classifying, organizing, and storing information in the repository, the data classification module can migrate information and data between applications without having to reenter information or convert data. As such, the data classification module can easily and efficiently transfer information and data between applications.

Figure 1:
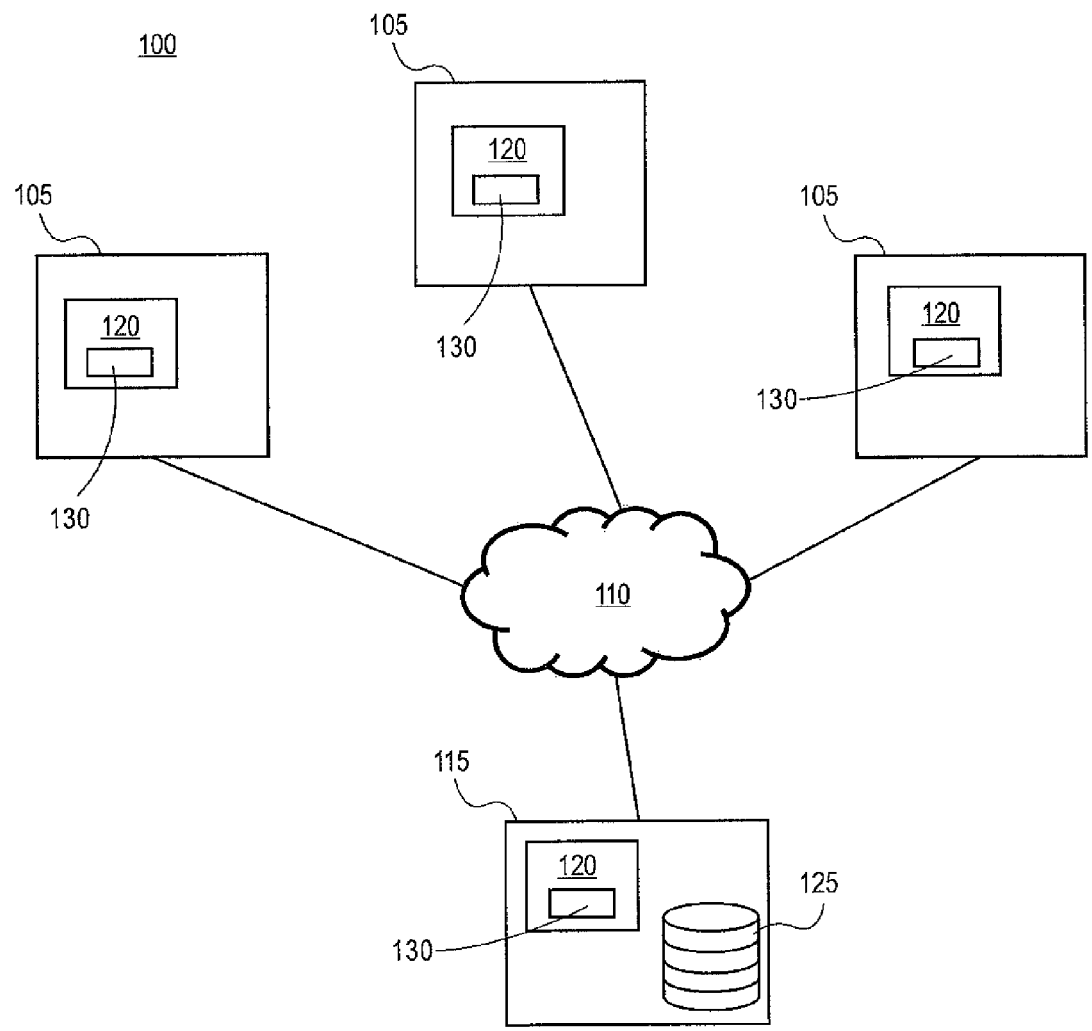
FIG. 1 illustrates an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes clients 105, a network 110 and a server 115. Client 105 is configured to provide users a platform for a software environment 120, such as described in FIG. 2. The users can be private individuals, employees of private business or public business or other persons interested in utilizing software environment 120 and accessing server 115. Client 105 can be implemented in personal computers, personal mobile devices, workstations or other networked computing platforms. While FIG. 1 illustrates three clients 105, those of ordinary skill in the art will realize that system 100 can include fewer or additional clients 105.

Network 110 can be a combination of wide area and local area networks such as the Internet. Network 110 can be configured to provide a communication channel between client 105 and server 115. Network 110 can implement a variety of network protocols to provide the communication channel such as Internet Protocol ("IP") Vx, ATM, SONET, or other similar network protocols.

Server 115 is configured to provide a variety or services and functions to client 105. Server 115 can be configured to provide application services, database services, website services, and the like. For example, server 115 can be configured to support software environment 120 and a database 125. Server 115 can be implemented in server computers, mainframes, workstations or other networked computing platforms. While FIG. 1 illustrates one server 115, those of ordinary skill in the art will realize that system 100 can include additional servers 115.

In accordance with various embodiments, the software environment can include a data classification module 130. The data classification module 130 can be configured to retrieve data from different applications. Each application can utilize data in a different format from other applications. The data classification module is configured to extract identifying information from the data, received from the applications. The identifying information includes information on entities and persons related to the data. For example, entities can be companies, corporations, associations, organization, and the like. Persons can be anyone related to the entities and the data such as employees of the entity.

The data classification module is configured to organize the identifying information into a data structure based on the entities associated with the data. After organization, the data classification module is configured to store the data structure in a searchable repository.

In some embodiments, the data classification module 130 is further configured to retrieve information from the repository and migrate the information into applications. The data classification module 130 is configured to receive a request to migrate information and data from the repository into an application. The request can include the type of application and the type of information and data requested. The application can be an new application or an existing application. In order to locate information and data to migrate, the data classification module is configured to maintain rules that describe how the various applications maintain data and information.

Figure 2:
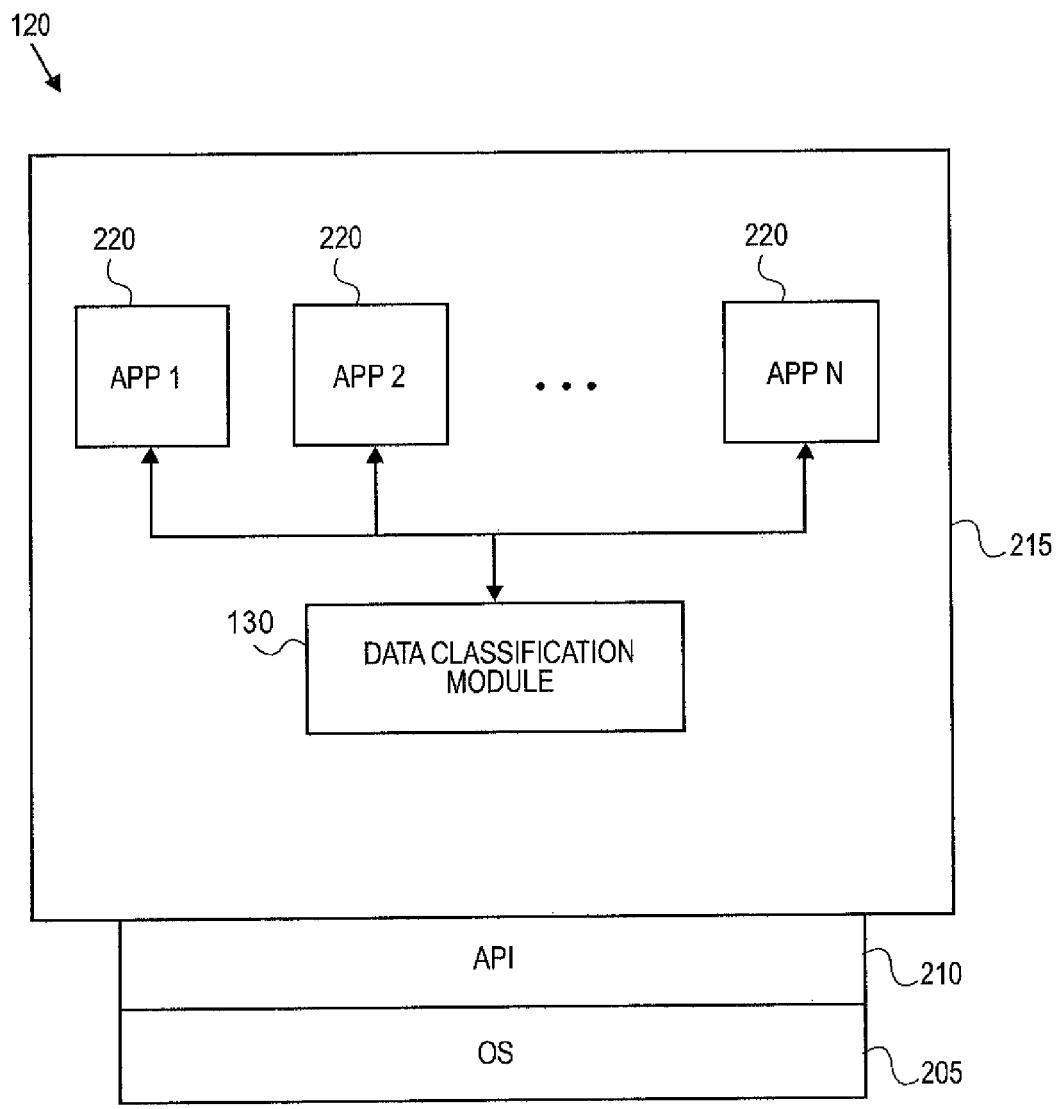
FIG. 2 illustrates an exemplary software environment in accordance with an embodiment.

FIG. 2 illustrates an exemplary software environment 120 in accordance with an embodiment. It should be readily apparent to those of ordinary skill in the art that software environment 120 depicted in FIG. 2 represents a generalized schematic illustration and that other components may be added or existing components may be removed or modified.

As shown in FIG. 2, software environment 120 can include an operating system 205. Operating system 205 can be a version of a Linux™, UNIX™, Windows™, or similar multitasking, multi-user operating system. A run-time environment (not shown) can be configured to execute on operating system 205. The run-time environment can provide a set of software that supports the execution of applications/programs. The run-time environment can also comprise an application program interface ("API") 210 and a complementary API (not shown) within an application space 215. API 210 can be configured to provide a set of routines that application space 215 uses to request lower-level services performed by operating system 205. Operating system 205 can include a kernel (not shown). The kernel can be configured to provide secure access to the underlying hardware of a processor.

Application space 215 can represent the space where a user can execute applications given the allotted memory space as determined by a system administrator of software environment 120. Within application space 215, a user can open and execute a number of applications 220. Applications 220 that can be executed within application space 215 can be a wide variety from databases, electronic mail, customer relationship management programs, utilities, browsers, multi-media application, word processing applications, spreadsheet applications, etc. Each of applications 220 has data objects, such as a native file and/or document format, that is associated with the respective application. For example, Microsoft Word™ has default document format, a Word document. Similarly, Adobe™ has a default document type, ".pdf" file, as another example.

Software environment 120 can further include a data classification module 130. Data classification module 130 can be configured to retrieve data from application 220. The data from each application 220 can be data objects that include any type of information (e.g., an email, email thread, forum, a website, a text file, an image or a Word document), each data object having a respective application 220 (browser, electronic mail, spreadsheet, content repository, etc.) The data object can also include abstract concepts such as events, projects, dates, places, and the like.

Data classification module 130 can be configured to extract identifying information from the data received from applications 220. The identifying information includes information on entities and persons related to the data. For example, entities can be companies, corporations, associations, organization, and the like. Person can be any one related to the entity or the data such as an employ of the entity.

Data classification module 130 organizes the identifying information into a data structure based on the entities associated with the data. After organization, data classification module 130 can be configured to store the data structure in a searchable repository, such as database 125. In particular, data classification module 130 stores the identifying information such that data from different applications 220 can be located by searching for an entity or person related to the data.

According to embodiments, data classification module 130 can be configured to retrieve information from database 325 and migrate the information into applications. In particular, data classification module 130 can be configured to receive a request to migrate information and data from database 325 into an application. The request can include the type of application and the type of information requested. The application can be an new application being installed into software environment 120. Likewise, the application can be an existing application 220 in software environment 120. In order to locate information and data to migrate, data classification module 130 is configured to maintain rules that describe how the various applications maintain data and information.

Figure 3:
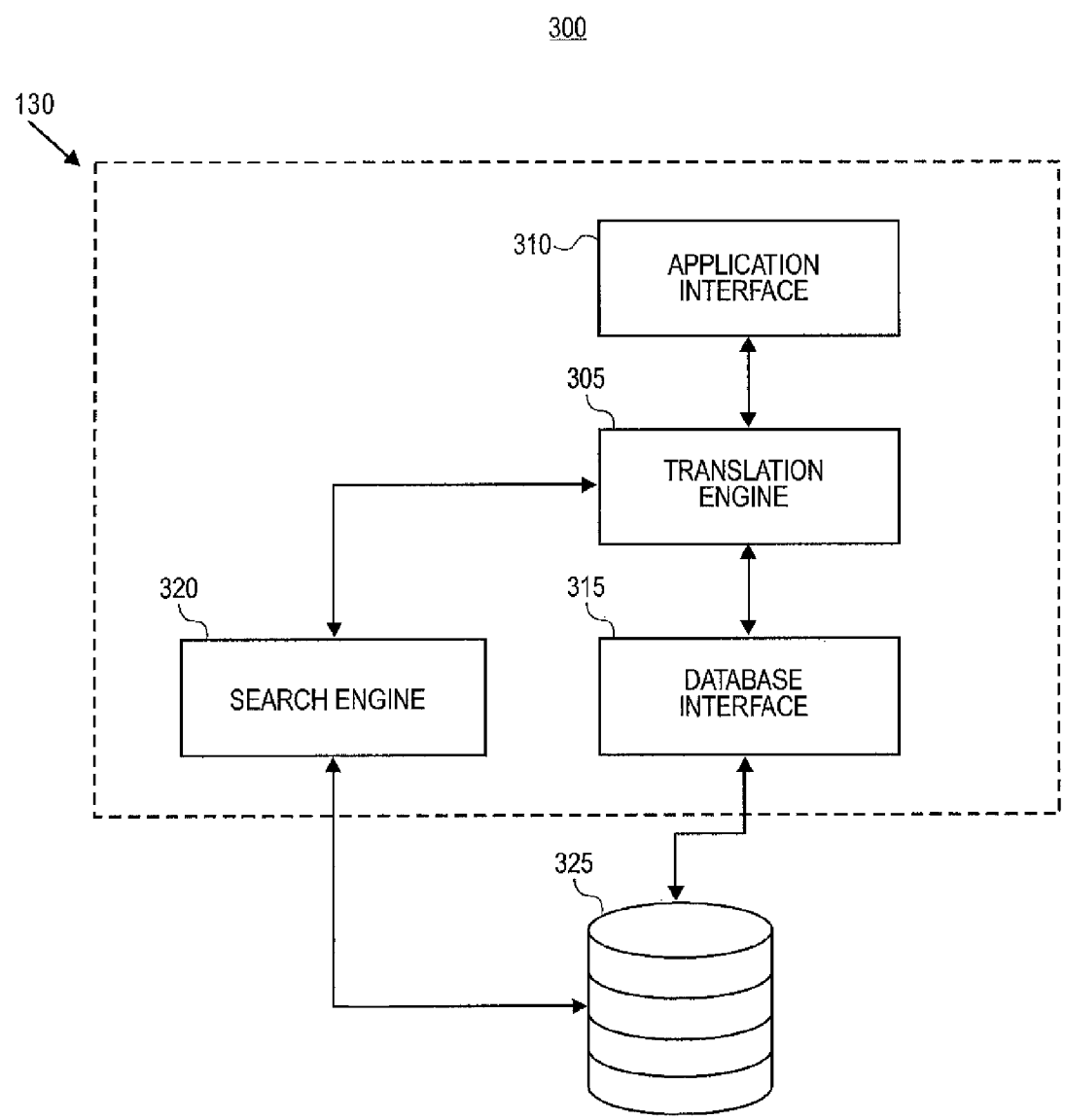
FIG. 3 illustrates an exemplary data classification module in accordance with another embodiment.

FIG. 3 depicts a more detailed block diagram 300 of data classification module 130 in accordance with another embodiment. It should be readily apparent to those of ordinary skill in the art that the diagram depicted in FIG. 3 represents a generalized schematic illustration and that other components may be added or existing components may be removed or modified.

As shown in FIG. 3, data classification module 130 can comprise a translation engine 305, an application interface 310, a database interface 315, and a search engine 320. Modules 305-320 of data classification module 130 can be implemented as software components, hardware components or combinations thereof. More particularly, modules 305-320 can be implemented using conventional programming languages (e.g., Pascal, FORTRAN, etc.), objected oriented programming languages (e.g., C++), Java, PHP, Perl, XML or other similar languages. Modules 305-320 can also be implemented as hardware components such as an application specific integrated circuit, a programmable read-only memory, an EEPROM, a microcontroller, a microprocessor or other similar computing platform.

Data classification module 130 can be coupled to a database 325. Database 325 can be implemented utilizing any type of conventional database architecture using open source technologies, proprietary technologies, or combinations thereof.

Translation engine 305 can be configured to manage modules 310-320 to provide the functionality of data classification module 130 as previously described and further described herein below. In particular, translation engine 305 is configured to receive data from different applications 220. The data received from the different applications can be in it respective native or default data format. For example, data received from an email application can be in the format for an email message or email thread. In another example, data received from a word processing application can be in the format of a word processing file.

In order to receive data from applications 220, translation engine 305 can be coupled to application interface 310. Application interface 310 can be configured to interface to different applications, such as applications 220, in order to retrieve data from the applications. Application interface 310 can be configured to retrieve data from applications 220 each time new data is entered into or created in application 220.

Likewise, application interface 310 can be configured to retrieve data from application 220 in response from a request from a user of software environment 120. For example, a menu icon that is linked to application interface 310 can be configured to be installed with applications 220. In some instances, applications 220 can be open source applications, which allow these configuration/installation modifications. If applications 220 are proprietary applications, i.e., not open source, applications 220 can permit the same configuration/installation modification depending on their published application program interfaces. When the menu icon is activated, application interface 310 can retrieve data from the activating application.

Translation engine 305 is configured to extract identifying information from the data received from applications 220. The identifying information can be the type of application the data was retrieved from, the subject of the data, a reference to the data, an entity associated with the data, and a person related to the entity and associated with the data and the like.

In order to extract identifying information from the application data, translation engine 305 can include rules for extracting identifying information from data received from each application 220. In particular, for each application 220, translation engine 305 can include a rule that sets forth the identifying information for data received from that application. For example, for data received from an email application, the rule can be that the identifying information includes the type email application, all recipients and senders of the email, and the subject of the email.

Translation engine 305 can extract the identifying information from the data itself or from meta data. For example, most data generated by applications include meta data. The meta data typically describes the property of the data such as application type, description of the data, creator of the data, and the like. Translation engine 305 can include a list of meta data included in data from different applications 220. Translation engine 305 can utilize the list in order to identify meta data in received data from applications 220.

The rules can further include how to extract the identifying information from the data. For example, for an email application, the rule can define that the type of application can be extracted from the meta data, the recipients and senders can be extracted from the "to," "from," and "cc" fields, and the description can be extracted from the "subject" field. As such, translation engine 305 can parse the data from application 220 in order to extract the identifying information.

After extracting the identifying information, data classification module 130 organizes the identifying information into a searchable data structure. To achieve this, translation engine 305 can be coupled to a database interface 315. Database interface 315 can organize the identifying information into a searchable data structure based on entities and persons associated with the entity. Database interface 315 can then store the organized identifying information in a searchable repository such as database 325.

Figure 4A:
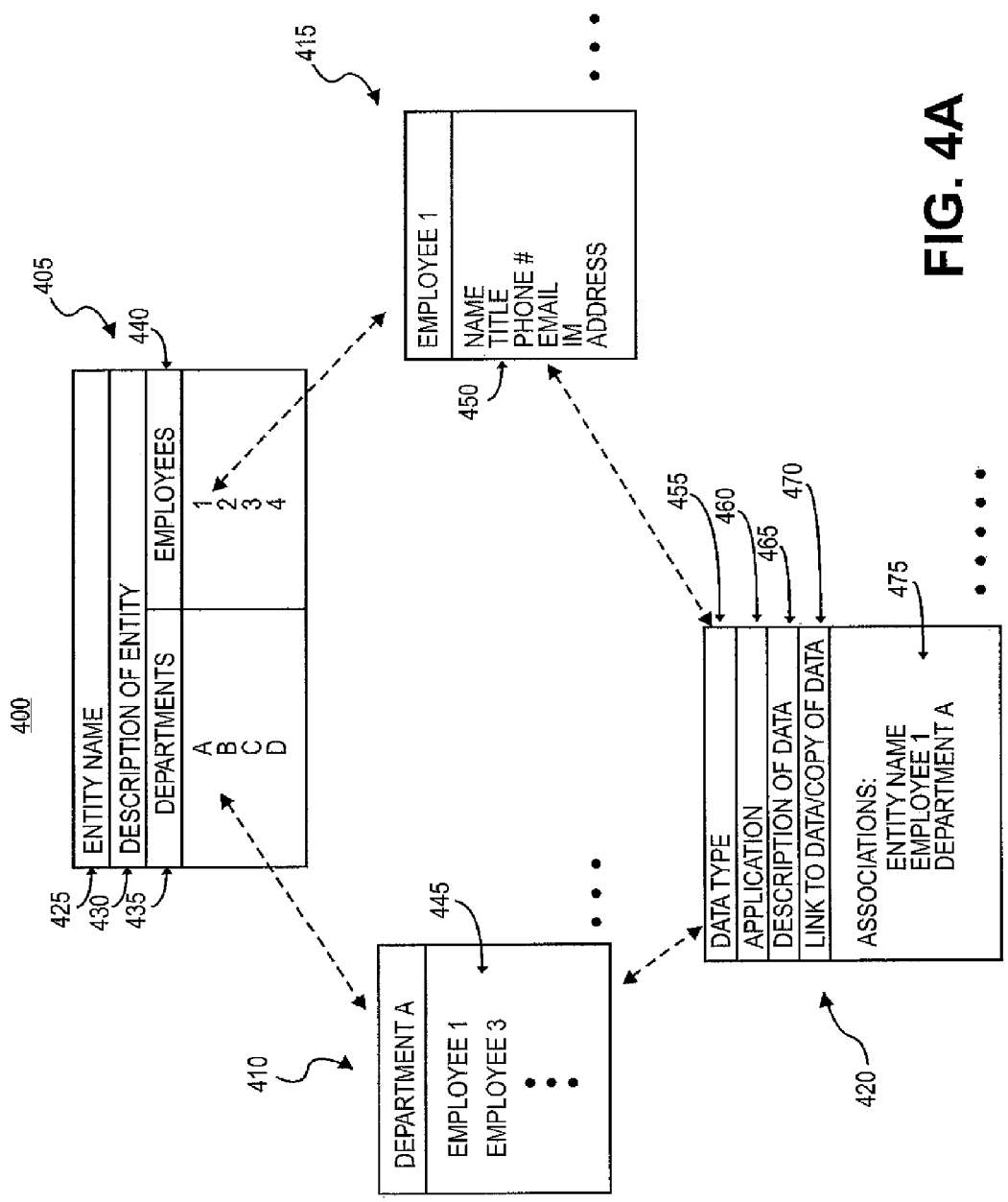
FIGS. 4A-4C illustrates exemplary data structures in accordance with yet another embodiment.

Database interface 315 utilizes a hierarchical relational structure 400 based on an entity and person associated with the entity to organize the identifying information, as shown in FIG. 4A. It should be readily apparent to those of ordinary skill in the art that the diagram depicted in FIG. 4A represents a generalized schematic illustration and that other components may be added or existing components may be removed or modified.

As illustrated in FIG. 4A, structure 400 includes records for entities, person related to the entity, and data related to the entity. Structure 400 can include an entity record 405, a department record 410, employee record 415, and data record 420.

Entity record 405 includes fields that identify and describe an entity. For example, entity record 405 can include an entity name field 425, a description field 430, a department field 435, and employees field 440. Entity name field 425 can be filled with information that identifies the entity such as the legal name of the entity. Description field 430 can be filled with information that describes the entity such as the address, phone number, and business type. Department field 435 can be filled with the various department or sections of the entity. Employee field 440 can be filled with the various employees of the entity. Although FIG. 4A illustrates only one entity record 405, it should be readily apparent to those of ordinary skill in the art that structure 400 can include any number of entity records 405 for each entity.

Department record 410 can include an employee field 445. Employee field 405 can be filled with employees of the entity that belong to the particular department. Although FIG. 4A illustrates only one department record 410, it should be readily apparent to those of ordinary skill in the art that structure 400 can include any number of department records 410 for each department of the entity.

Employee record 415 can include an employee information field 450. Employee information field 450 can be filled with details of the employee such as name, title, phone number, email address, instant message "IM" handle, physical address, and the like. Although FIG. 4A illustrates only one employee record 415, it should be readily apparent to those of ordinary skill in the art that structure 400 can include any number of employee records 415 for each employee of the entity.

Data record 420 can include information that identifies data received from applications. Data record 420 can include a data type field 455, an application type field 460, a description field 465, reference field 470, and associations field 475. Data type field 455 can be filled with information that describes the type of data the record identifies, such as email message, word processing file, invoice, and the like.

Application type field 460 can be filled with information that identifies the application associated with the data, such as email application, word processing application, financial application, and the like. Reference field 470 can be filled with a information identifying a storage location of the data such as a link to the data. Associations field 475 can be filled with information identifying employees, departments, and entities associated with the data. Although FIG. 4A illustrates only one data record 420, it should be readily apparent to those of ordinary skill in the art that structure 400 can include any number of data records 420 for each data item received from an application.

Structure 400 illustrated in FIG. 4A shows the relation of the identifying information for received data to a particular entity. Database interface 315 can also be configured to generate a data structure that references all entities and all persons associated with the entities. This data structure can be utilized during searching.

Figure 4B:
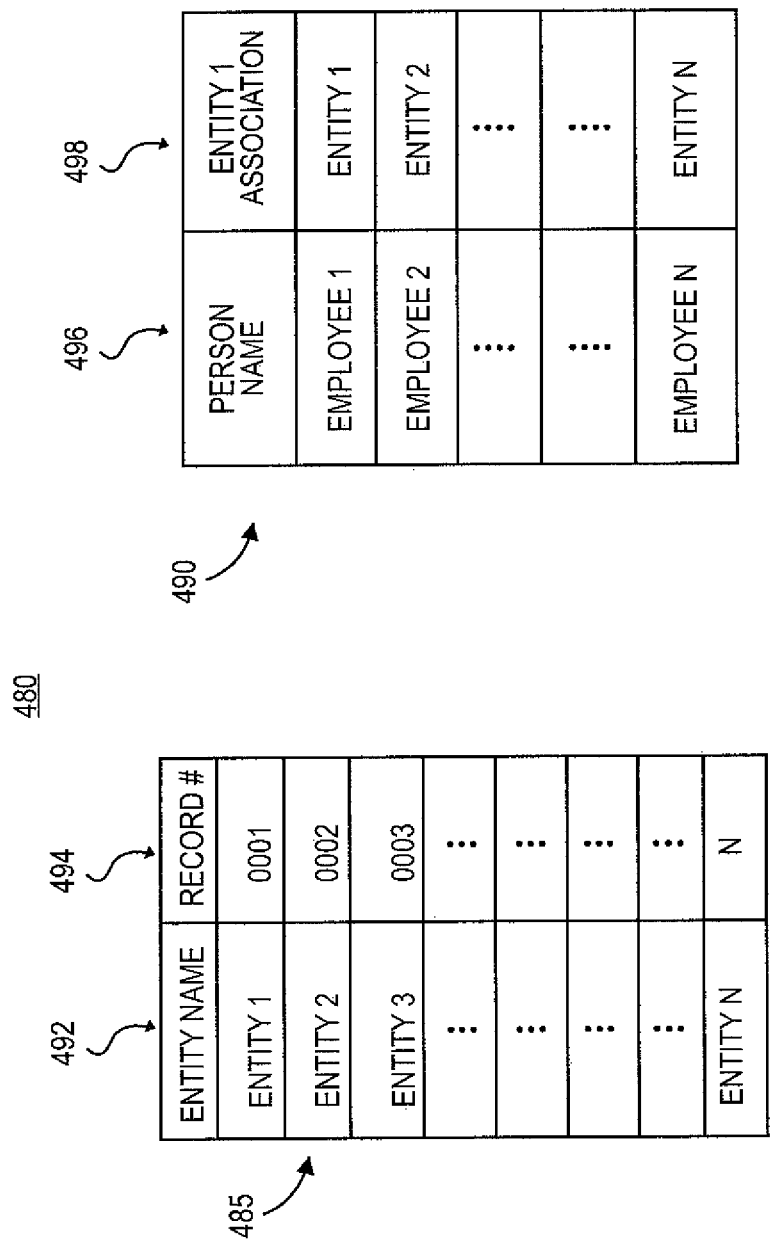

FIG. 4B show an exemplary structure 480 that references all entities and persons. It should be readily apparent to those of ordinary skill in the art that the diagram depicted in FIG. 4B represents a generalized schematic illustration and that other components may be added or existing components may be removed or modified.

As illustrated in FIG. 4B, structure 480 can include entity listing record 485 and persons listing record 490. Structure 480 can aid with searching by allowing data classification module 130 to search by the name of an entity or a person and locate records associated with the entity or person.

Entity listing record 485 can include an entity name fields 492 and record number fields 494. Entity name fields 492 can be filled with the names of entities for which records 405 exist. Record number fields 494 can be filled with an identifier, such as record number, that identifies the record associated with each entity name.

Persons listing record 490 can include person name fields 496 and entity association fields 498. Person name fields 496 can be filled with the names of persons, such as employees of the entities, that have been identified in structure 400. Entity association fields 498 can be filed with an entity with which the named persons are associated.

Prior to storing information in data structure 400, record entry 405 in the hierarchy must be generated for different entities. Record entry 405 for each entity can be generated by designating one application 220 as a master application. Typically, this master application would have all the data required for record 405. For example, a financial application can be designated as the master application. Since the financial application typically includes information about all entities, the financial application would include most information in record 405.

Each time the master application receives information about a new entity from a user, a new record 405 can be created for the new entity. The new record 405 can be populated with the data entered in the master application.

Figure 5:
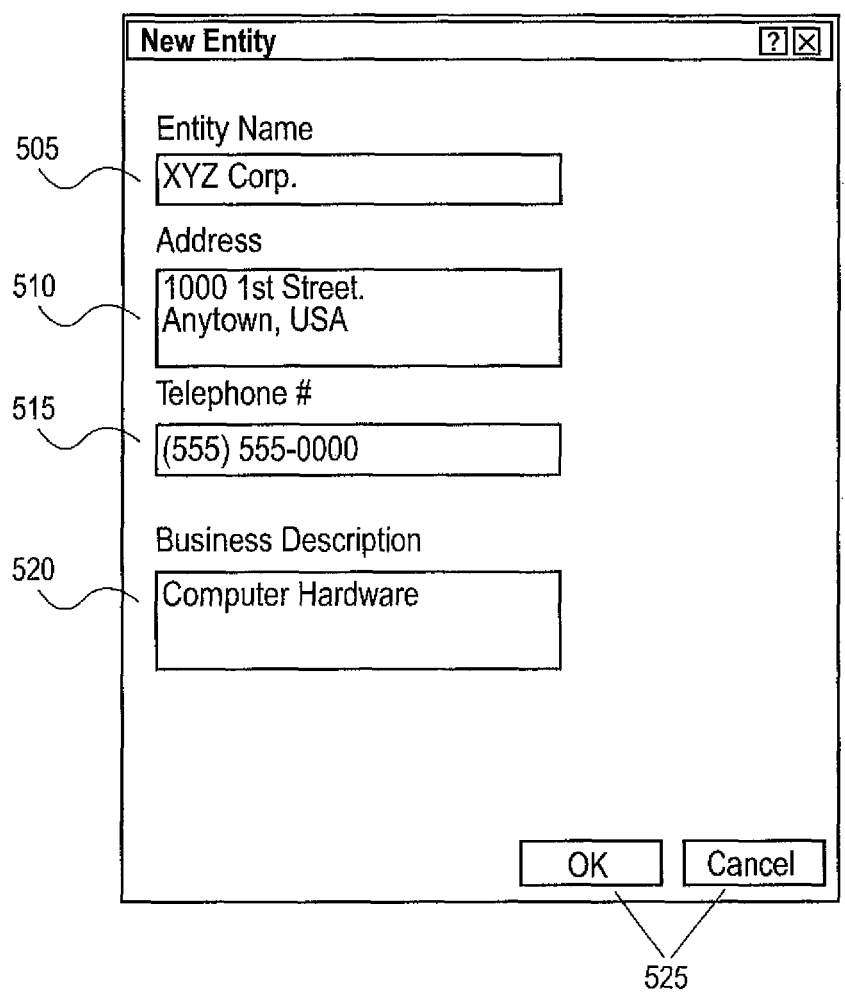
FIG. 5 illustrates an exemplary interface in accordance with yet another embodiment.

In addition to designating a master application, application interface can be configured to generate a graphical user interface, ("GUI") such as dialog boxes, web pages and the like in order to create a new record 405. The GUI can include field for entering information about the new entity such as name of the entity, address, telephone number, contact person, and the like. FIG. 5 illustrates an exemplary GUI 500 for creating a new record 405. It should be readily apparent to those of ordinary skill in the art that the diagram 500 depicted in FIG. 5 represents a generalized schematic illustration and that other components may be added or existing components can be removed or modified.

As illustrated, GUI 500 can includes an entity name text field 505, an address text field 510, telephone number text field 515, a business description text field 520, and confirmation buttons 525. A user can enter the identity of the entity in text field 505, the address of the entity in text field 510, the telephone number of the entity in text field 515, and description of the entity in text field 520.

Once the user has entered the information in text fields 505-520, the user can transmit the identifying information to data classification module 130 by selecting the "OK" button of confirmation buttons 525. The user can also cancel the request by selecting the "Cancel" button of the confirmation buttons 525.

Figure 4C:
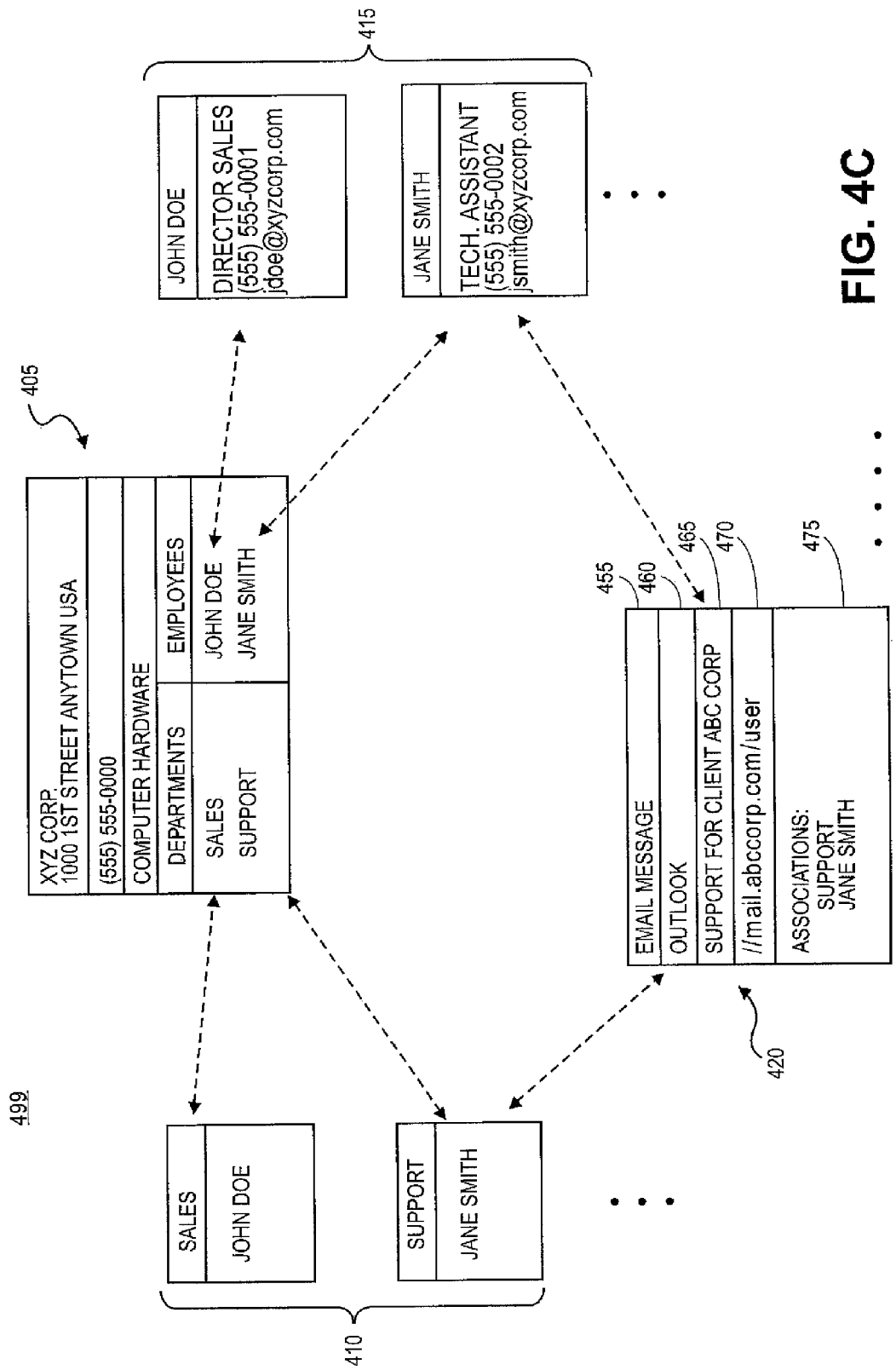

After a record 405 has been created, data classification module 130 can begin receiving data associated with the entity identified in record 405. FIG. 4C illustrates an exemplary structure 499 in which the records 405-420 have been filled with identifying information.

As illustrated, entity record 405 can be created and filled with information for an entity named "XYZ Corp." Entity record 405 can be created an filled by a master application or by a GUI such as GUI 500. Also, department records 410 and employees records 415 can be created and filled with information for the entity "XYZ Corp." Department records 410 and employees records 415 can be created an filled by the master application or by a GUI such as GUI 500.

Also, as illustrated in FIG. 4C, record 420 can created and can be filled with data from an email application such as Outlook. For example, a user of another entity "ABC corp" can be operating an application 220, such as Outlook. Application 220 can receive an email from "Jane Smith" at "XYZ Corp" with the subject "Support for client ABC Corp." The email can be regarding a technical support issue at "ABC Corp" that "XYZ Corp" is servicing. Once application 220 receives the email, a request can automatically be sent to data classification engine 130 to retrieve the email and classify the email. Likewise, the request can be initiated by the user.

After receiving the request, translation engine 305 can extract the identifying information from the email in order to fill record 420. For example, translation engine 305 can extract, from the email, the type of email program from the meta data; the sender of the email, "Jane Smith," from the sender's email address; the entity, "XYZ Corp," associated with the sender from the senders email address; and a storage location, "//mail.xyzcorp.com/user," from the meta data.

After extracting the identifying information, database interface 315 can create record 420 and fill record 420 with the extracted information. For example, data type field 455 can be filled "email message"; application type field 460 can be filled "Outlook," the email application receiving the email; reference field 470 can be filled "//mail.abccorp.com/user," the mail server for "ABC Corp" where the email is stored; and associations field 475 can be filled with "Jane Smith" and "Support". Database interface 315 can then store record 420 in database 325 linked to records 405, 410, and 415.

Returning to FIG. 3, data classification module 130 can include a search engine 320. Search engine 320 can be an independent module 320 or be part of database 325 in some embodiments. Search engine 320 can be configured to receive a query from translation engine 305 that includes search topics related to any fields and records included in data structures stored in database 325, such as data structures 400 and 480 illustrated in FIGS. 4A and 4B.

According to embodiments, data classification module 130 can be configured to retrieve information from database 325 and migrate the information into applications. In particular, data classification module 130 can be configured to receive a request, via application interface 310, to migrate information and data from database 325 into an application. The request can include the type of application and the type of information requested. The application can be an new application being installed into software environment 120. Likewise, the application can be an existing application 220 in software environment 120.

In order to locate information and data to migrate, data classification module 130 is configured to maintain rules that describe how the various applications maintain data and information. In particular, translation engine 305 can receive the request from application interface 310 and generate a search request for search engine 320. The search request can include the type of application and the type of information request. After search engine 320 locates information matching the search request in database 325, translation engine 305 can retrieve the information via database interface 315.

Once translation engine 305 receives the information, translation engine 305 is configured to organize the information into a format utilized by the requesting application. For example, translation engine 305 can be configured to organize the information into the native or default file format utilized by the requesting application. Once the information is organized, translation engine 305 is configured to provide the organized information to the requesting application via application interface 310.

For example, an Email application can request migration of information and data. As such, application interface 310 can receive a request to migrate information in database 325 into the Email application. The request can include the type of application, i.e. Email application, and the particular version of the application, e.g. GMAIL.

Translation engine 305 can receive the request and examines the rules for the particular application. For example, translation engine 305 can receive the request and determines that the requesting application is an Email application. Examining the rules for an Email application, translation engine 305 can determine that the Email application can utilize information such as contact information (entity names, person names, email address, physical address, etc.) and can utilize data such as Email message.

As such, translation engine 305 can generate a search request for all available contact information and Email data. Translation engine 305 can pass the search request to search engine 320.

In response, search engine 320 can perform a search of database 325 based on the search request. In particular, search engine 320 can examine records 405, 410, and 415 for contact information of entities and persons associated with entities. Additionally, search engine 320 can examine records 420 to determine any Email data stored in database 325.

Translation engine 305 can then retrieve the located information and data via database interface 315. Once the information and data has been retrieved, translation engine 305 can utilize the application rules in order to convert the retrieved data into a format usable by the requesting application. For example, translation engine 305 can examine the rules for GMAIL Email application and organize the retrieved contract information into a format usable by the GMAIL address book. Additionally, translation engine 305 can convert the retrieved Email data into a native email format utilized by GMAIL.

Translation engine 305 can then pass the retrieved information and data to application interface 310. Application interface 310 can provide the retrieved information to the requesting Email application.

The application requesting migration can be a new application 220 installed into software environment 120. As such, new application 220 can configured to automatically initiate an information migration upon the installation of the new application. For example, new application 220 can transit an request to initiate the information migration.

In response, application interface 310 can be configured to generate an interface to allow an installer of the new application 220 to proceed with the information migration. Additionally, application interface 310 can be configured to generate the interface to allow the installer of the new application to specify the type of information to migrate.

Figure 6A:
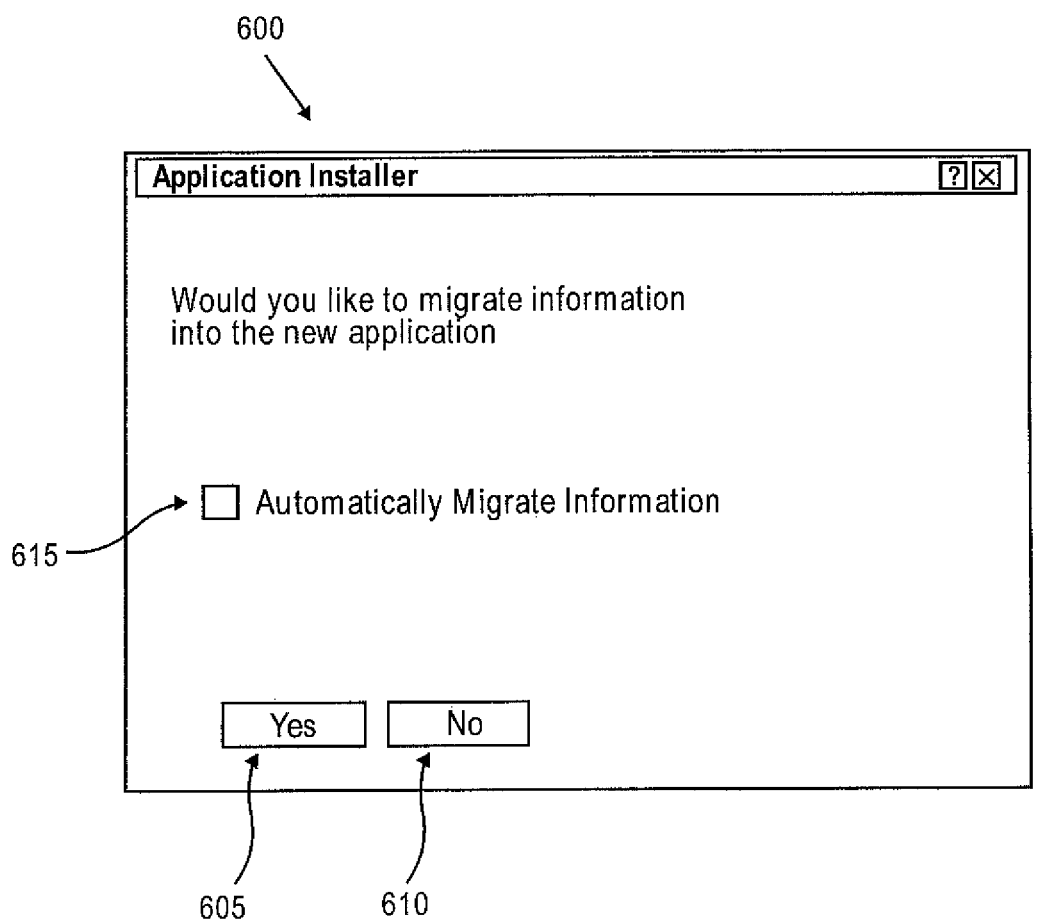
FIGS. 6A-6B each illustrate an exemplary interface for allowing migration of information and data in accordance with yet another embodiment.

FIG. 6A shows an exemplary interface 600 to allow an installer to initiate information migration. As illustrated, interface 600 allows the installer to choose to initiate a migration of information. Interface 600 includes a confirm button 605 and a decline button 610. If the installer chooses to initiate the migration, the installer can select button 605. If the installer chooses not to initiate the migration, the installer can select button 610.

Interface 600 can also be configured to include a selection widget 615. Selection widget 615 allows a user to select to automatically migrate the data into new application 220. In response to selecting widget 615, translation engine 305 can retrieve all data relevant to new application 220 and migrate all the retrieve data into a format utilized by new application 220.

If the user chooses not to automatically migrate the data, data classification module 130 can be retrieve all data relevant to new application 220 and generate an interface to allow the user to select the information and data to migrate into new application 220.

In particular, translation engine 305 can generate a search request to search for all information and data that would be compatible with new application 220. In response, translation engine 305 can retrieve all the located information and data that is compatible with new application 220. Translation engine 305 can be configured to pass the retrieved information and data to application interface 310. Application interface 310 can be configured to generate an interface to display the retrieved information and data to the user and to allow the user to select the retrieved information and data to migrate to new application 220.

Figure 6B:
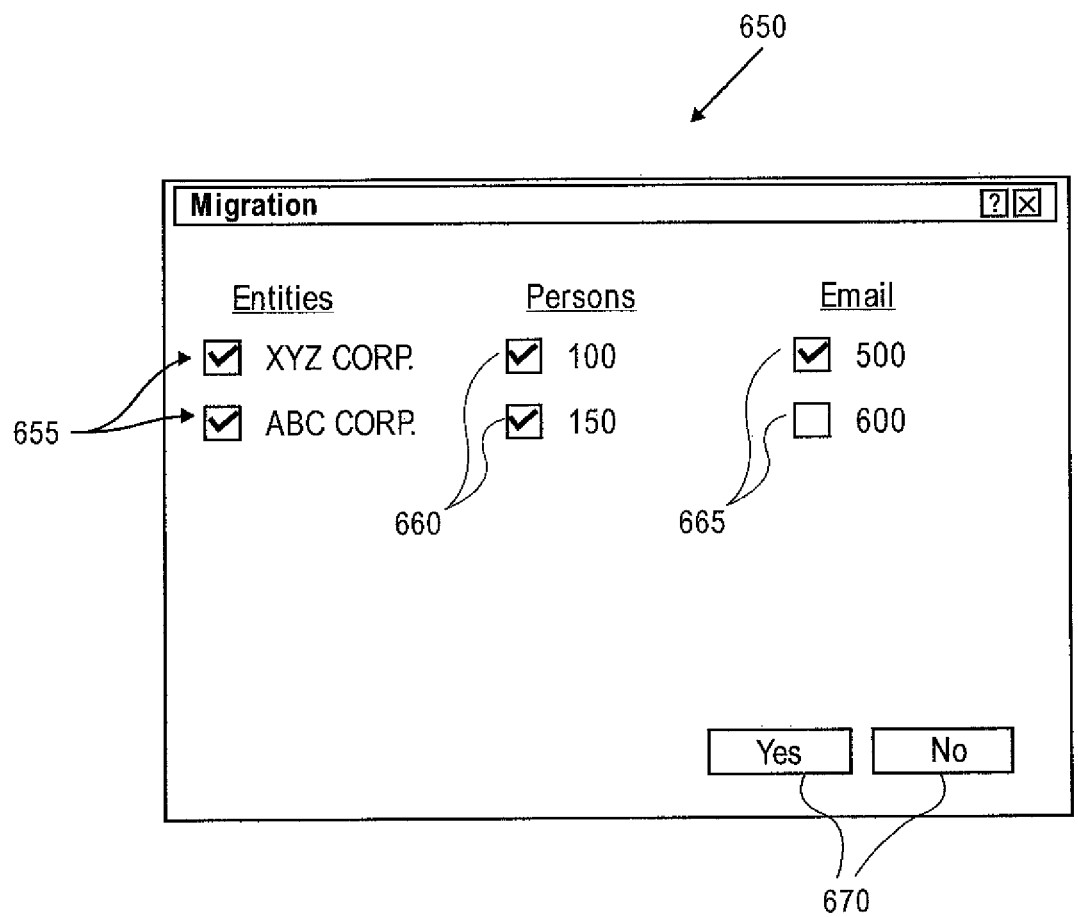

FIG. 6B shows an exemplary interface 650 to allow the user to select the information and data to migrate into new application 220. As shown, interface 650 includes entities selection widgets 655, person selection widgets 660, data selection widgets 665, and confirmation buttons 670.

Entities selection widgets 655 are configured to allow the user to select information about entities to be migrated to new application 220. For example, as illustrated, translation engine 655 can retrieve information about entities "XYZ Corp." and "ABC Corp."

Person selection widgets 660 are configured to allow the user to select information about persons to be migrated to new application 220. For example, as illustrated, translation engine 655 can retrieve information about 100 person associated with entity "XYZ Corp." and 150 persons associated with "ABC Corp."

Data selection widgets 665 are configured to allow the user to select data associated with entities to be migrated to new application 220. For example, as illustrated, translation engine 655 can retrieve data about 500 email messages associated with entity "XYZ Corp." and 600 email messages associated with "ABC Corp."

In interface 650, a user can select the desired widgets 655, 660, and 665 to migrate the associated information and data. Once the widgets are selected, the user can select one of the confirmation buttons 670 to initiate the migration or cancel the migration process. Once the user selections the confirmation buttons, translation engine 305 can organize the information and data into a format utilized by new application 220.

One skilled in the art will realize that FIG. 6B is exemplary and can include additional components. In particular, interface 650 can be configured to display more detailed information about the person and data. Additional, while interface 650 illustrates data for migration into a Email application, one skilled in the are will realize that interface 650 can be configured to display any data type compatible with the application requesting migration.

In additional to new application 220 migrating information and data, existing applications 220 can be modified in order to allow a user of application 220 to submit requests to migrate information and data from database 325. For example, a menu icon that is linked to application interface 310 can be configured to be installed with applications 220. As such, application interface 310 can generate interfaces similar to those interfaces described above in FIGS. 6A and 6B.

Figure 7:
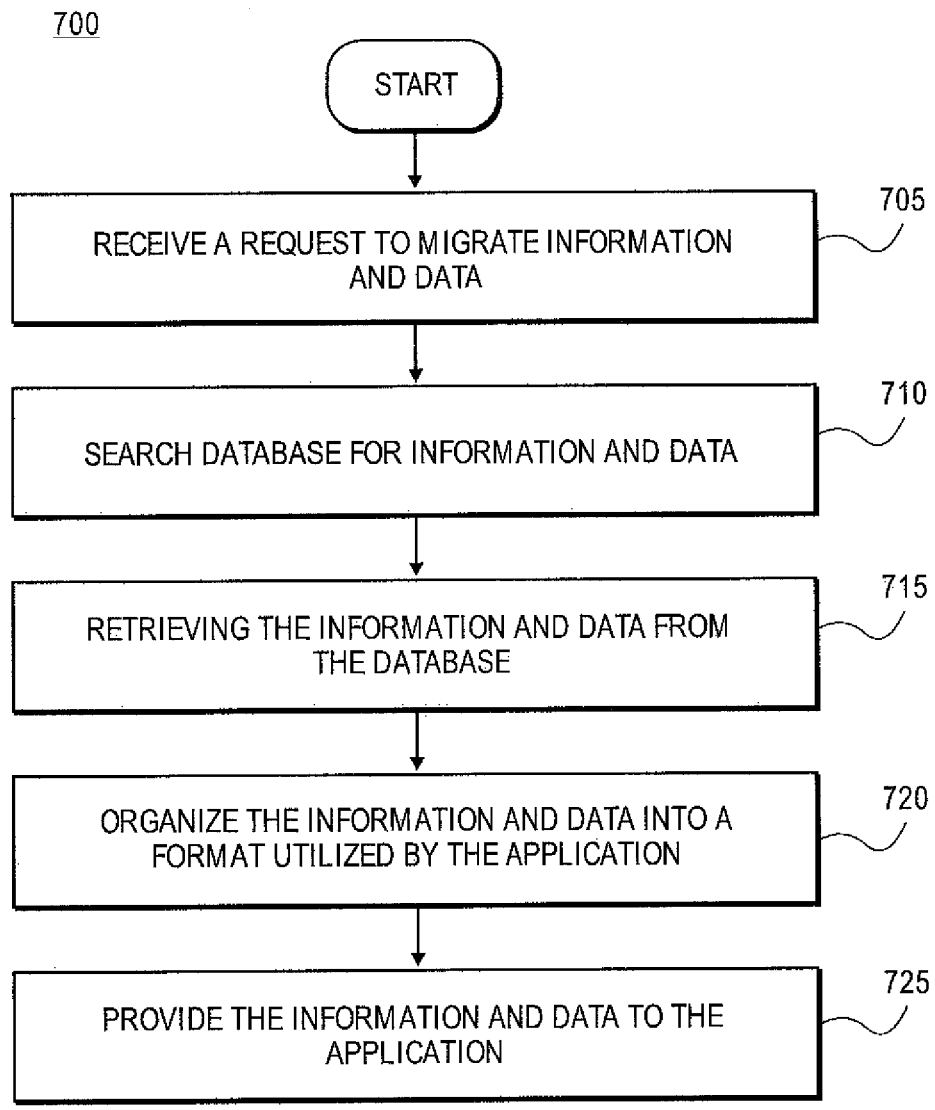
FIG. 7 illustrates an exemplary process flow of a data classification module in accordance with another embodiment.

FIG. 7 depicts an exemplary migration flow diagram 700 implemented by data classification module 130 in accordance with another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, data classification module 130 can be configured to receive a request from an application 220 to migrate information and data from database 325, in step 705. The request can include the type of application and the type of information and data for migration.

Then, data classification module 130 searches the repository for information to migrate based on the request, in step 710. Specifically, translation engine 305 is configured to direct search engine 320 to search database 325 for information that is compatible with the application.

After the information and data to migrate, data classification module 130 retrieves the information and data from the database, in step 715. Specifically, translation engine 305 can direct database interface 315 to retrieve the information from database 325.

Then, data classification module 130 organizes the information and data into a format utilized by the application, in step 720. Specifically, translation engine 305 can organize the information and data into a format native to the application based on the rules maintained by translation engine 305. After organizing the information and data, data classification module 130 provides the information and data to the application, in step 725.

Figure 8:
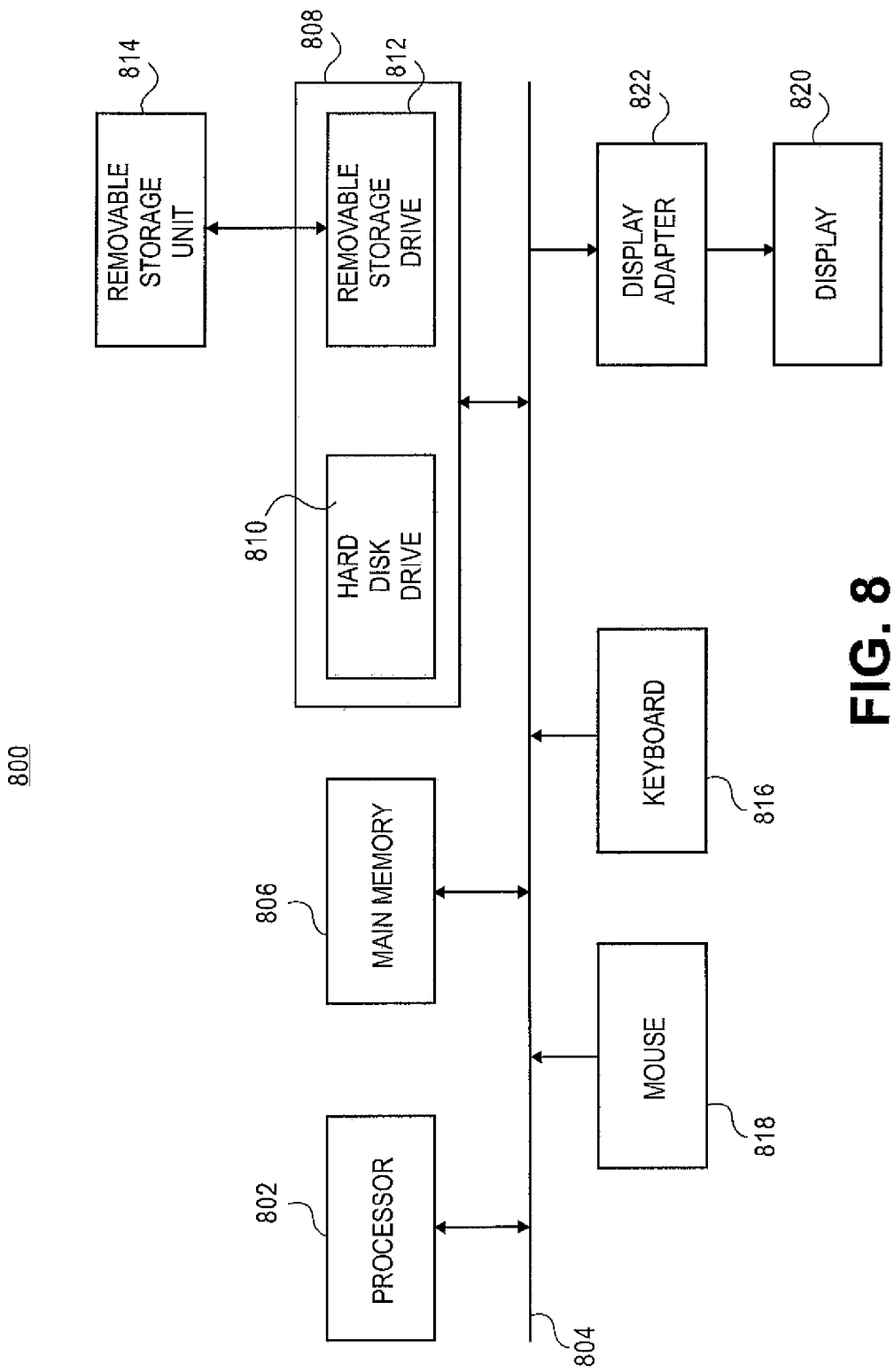
FIG. 8 illustrates an exemplary computer platform in accordance with another embodiment.

FIG. 8 illustrates an exemplary block diagram of a computing platform 800 where an embodiment may be practiced. The functions of the data classification module 130 can be implemented in program code and executed by computing platform 800. Data classification module 130 can be implemented in computer languages such as PASCAL, C, C++, JAVA, etc.

As shown in FIG. 8, computing platform 800 includes one or more processors, such as processor 802 that provide an execution platform for embodiments of data classification module 130. Commands and data from processor 802 are communicated over a communication bus 804. Computing platform 800 also includes a main memory 806, such as a Random Access Memory (RAM), where data classification module 130 can be executed during runtime, and a secondary memory 808. Secondary memory 808 includes, for example, a hard disk drive 810 and/or a removable storage drive 812, representing a floppy diskette drive, a magnetic tape drive, a compact disk drive, etc., where a copy of a computer program embodiment for data classification module 130 can be stored. Removable storage drive 812 reads from and/or writes to a removable storage unit 814 in a well-known manner. A user interfaces with the data classification module 130 with a keyboard 816, a mouse 818, and a display 820. Display adapter 822 interfaces with the communication bus 804 and display 820. Display adapter 822 also receives display data from processor 802 and converts the display data into display commands for display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   receiving a request to migrate, to an electronic mail application, a document stored in a repository, wherein the document comprises a first information in a first document format that is incompatible with the application;
   identifying, by a processor, in the document, a second information in a second document format that is compatible with the application;
   extracting, by the processor, the identified second information from the document in view of a data received from the application and a rule associated with the identified information for the data, wherein the extracting comprising applying the rule to extract the identified information from a metadata associated with the data;
organizing, by the processor, the second information in the second document format into a new document as a data structure in view of an entity and a person associated with the entity, wherein the new document is searchable in the repository; and
migrating, by the processor, the new document to the application.

2. The method of claim 1, wherein the request comprises a version of the electronic mail application.

3. The method of claim 1, wherein identifying the second information further comprises:
determining an electronic mail message in view of the electronic mail application.

4. The method of claim 1, further comprising:
providing the second information to the application.

5. The method of claim 1, wherein the application is a newly installed application and wherein the request is received upon installation of the application.

6. The method of claim 1 further comprising:
storing the entity in the data structure as a one record among a plurality of records; and
storing the person associated with the entity as a second record among the plurality of records, wherein the second record is associated with the first record.

7. The method of claim 2 wherein the rule comprises one of a recipient associated with the electronic mail message, a sender associated with the electronic mail message and a subject associated with the electronic mail message.

8. An apparatus comprising:
a memory; and
a processor, operatively coupled to the memory to:
receive a request to migrate, to an electronic mail application, a document stored in a repository, wherein the document comprises a first information in a first document format that is incompatible with the application;
identify, in the document, a second information in a second document format that is compatible with the application;
extract the identified second information from the document in view of a data received from the application and a rule associated with the identified information for the data, wherein the extracting comprising applying the rule to extract the identified information from a metadata associated with the data;
organize the second extracted information in the second document format into a new document as a data structure in view of an entity and a person associated with the entity, wherein the new document is searchable in the repository as a data structure in view of an entity and a person associated with the entity; and
migrate the new document to the application.

9. The apparatus of claim 8, wherein the request comprises a version of the electronic mail application.

10. The apparatus of claim 8, wherein to identify the second information, the processor is to determine an electronic message in view of the electronic mail application.

11. The apparatus of claim 8, wherein the processor is to provide the second information to the application.

12. The apparatus of claim 8, wherein the application is a newly installed application and the processor is to receive the request upon installation of the newly installed application.

13. The apparatus of claim 8, wherein the processor is to:
store the entity in the data structure as a one record among a plurality of records; and
store the person associated with the entity as a second record among the plurality of records, wherein the second record is associated with the first record.

14. The apparatus of claim 9 wherein the rule comprises one of a recipient associated with the electronic mail message, a sender associated with the electronic mail message and a subject associated with the electronic mail message.

15. A non-transitory computer-readable storage medium comprising data that, when accessed by a processor, cause the processor to:
receive a request to migrate, to an electronic mail application, a document stored in a repository, wherein the document comprises a first information in a first document format that is incompatible with the application;
identify, by the processor, in the document, a second information in a second document format that is compatible with the application;
extract, by the processor, the identified second information from the document in view of a data received from the application and a rule associated with the identified information for the data-, wherein the extracting comprising applying the rule to extract the identified information from a metadata associated with the data;
organize, by the processor, second information in the second document format into a new document as a data structure in view of an entity and a person associated with the entity, wherein the new document is searchable in the repository; and
migrate, by the processor, the new document to the application.

16. The non-transitory computer-readable storage medium of claim 15 wherein the request comprises a version of the electronic mail application.

17. The non-transitory computer-readable storage medium of claim 15, wherein to identify the second information, the processor is to determine an electronic mail message in view of the electronic mail application.

18. The non-transitory computer-readable storage medium of claim 15 wherein the processor is to provide the second information to the application.

19. The non-transitory computer-readable storage medium of claim 15 wherein the application is a newly installed application and wherein the request is received upon installation of the application.

20. The non-transitory computer-readable storage medium of claim 15 wherein the processor is to:
store the entity in the data structure as a one record among a plurality of records; and
store the person associated with the entity as a second record among the plurality of records, wherein the second record is associated with the first record.

21. The non-transitory computer-readable storage medium of claim 16 wherein the rule comprises one of a recipient associated with the electronic mail message, a sender associated with the electronic mail message and a subject associated with the electronic mail message.

* * * * *